Figure 1:
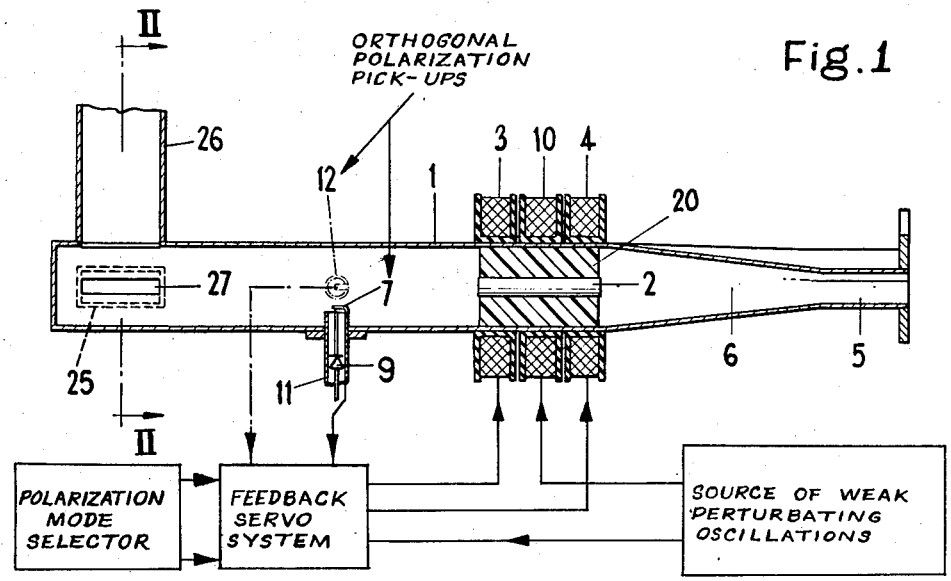

3,130,379
WAVEGUIDE SWITCHING USING FEEDBACK-CONTROLLED SERVO SYSTEM TO ROTATE THE PLANE OF POLARIZATION OF PLANE-POLARIZED ELECTROMAGNETIC WAVES
John Hadley, Wembley, England, assignor to The General Electric Company Limited, London, England
Filed Aug. 26, 1960, Ser. No. 52,302
Claims priority, application Great Britain Aug. 28, 1959
3 Claims. (Cl. 333—7)

This invention relates to apparatus for effecting rotation of the plane of polarization of plane-polarized electromagnetic waves.

The invention is also concerned with apparatus for switching electromagnetic waves selectively to either one of two waveguides.

It is well known that the plane of polarization of a plane-polarized electromagnetic wave may be rotated if it is passed through a waveguide which is of circular cross-section and which contains suitable ferrite material which may, for example, be in the form of a rod. The amount of rotation depends upon the magnetic field in which the ferrite material lies and one object of the present invention is to make provision in such an arrangement for controlling the amount of rotation of the plane of polarization so that the resulting waves have a predetermined plane of polarization.

Another object of the invention is to provide apparatus which enables plane-polarized electromagnetic waves supplied by the apparatus to be polarized selectively in either one of two planes.

Yet another object of the invention is to provide apparatus which enables electromagnetic waves to be passed selectively to either one of two waveguides.

According to the present invention, apparatus for effecting rotation of the plane of polarization of plane-polarized electromagnetic waves comprises a device of the kind comprising a length of waveguide which contains ferromagnetic ceramic material, for example ferrite material, and which is arranged to effect rotation of the plane of polarization of plane-polarized electromagnetic waves transmitted through the length of waveguide in dependence upon the magnetic field in which the ferromagnetic ceramic material lies, means to cause the magnetic field in which the ferromagnetic ceramic material lies to be varied periodically, a polarization-sensitive coupling which is adapted to supply an electric signal having an amplitude dependent upon the plane of polarization of waves transmitted by said waveguide after rotation by said device, and means to control the steady magnetic field in which the ferromagnetic ceramic material lies, and on to which is superimposed the variation previously mentioned, in dependence upon the variation in the amplitude of said signal resulting from the magnetic field being varied as aforesaid so that the waves passed by said device have substantially a predetermined plane of polarization.

The means to cause the magnetic field to vary may be adapted to cause that field to vary sinusoidally.

According to a feature of the present invention, apparatus for effecting rotation of a plane of polarization of plane-polarized electromagnetic waves comprises a device of the kind comprising a length of waveguide which contains ferromagnetic ceramic material, for example ferrite material, and which is arranged to effect rotation of the plane of polarization of plane-polarized electromagnetic waves transmitted through the length of waveguide in dependence upon the magnetic field in which the ferromagnetic ceramic material lies, means to cause the magnetic field in which the ferromagnetic ceramic material lies to be varied periodically, two polarization-sensitive couplings which are spaced round the said waveguide and each of which is adapted to supply an electric signal having an amplitude dependent upon the plane of polarization of waves transmitted by said waveguide after rotation by said device, and means selectively to control the steady magnetic field in which the ferromagnetic ceramic material lies, and on which is superimposed the variation previously mentioned, effectively in dependence upon the variation in the amplitude of the signal supplied by one or other of said couplings resulting from the magnetic field being varied as aforesaid so that the waves passed by said device may selectively be polarized in either one of two planes.

If the arrangement is such that the two planes are at right angles, two further lengths of waveguide may be connected to the previously mentioned length of waveguide so that each is coupled to the previously mentioned waveguide in respect of one of the two planes of polarization and not the other, the apparatus then constituting a switch since electromagnetic waves supplied to the apparatus can be passed selectively to either one of the two further lengths of waveguide.

Figure 2:
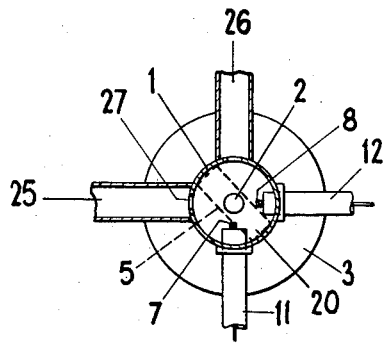
Figure 3:
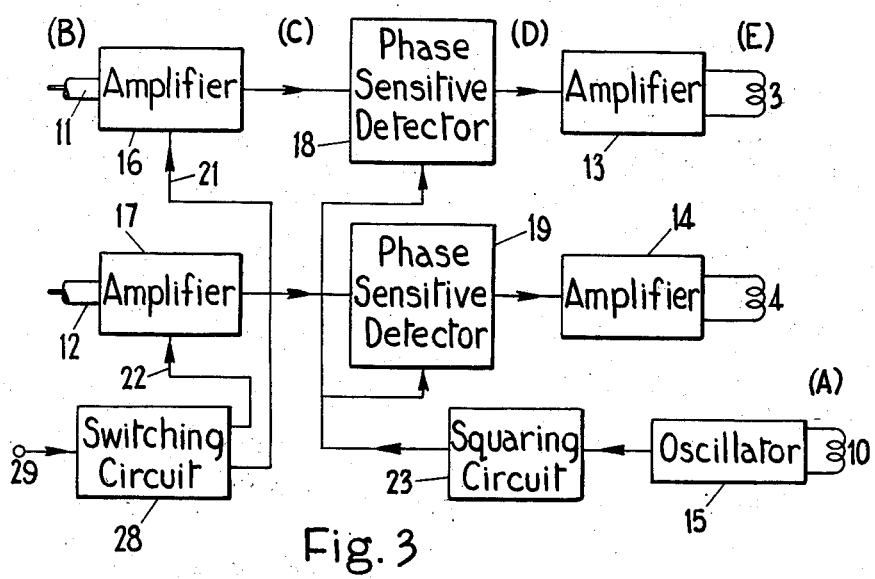
Figure 4:
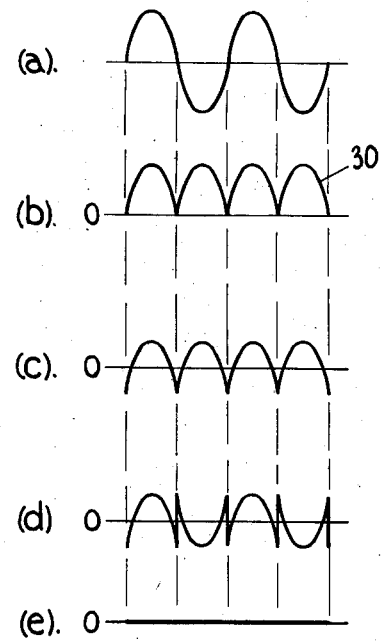
Figure 5:
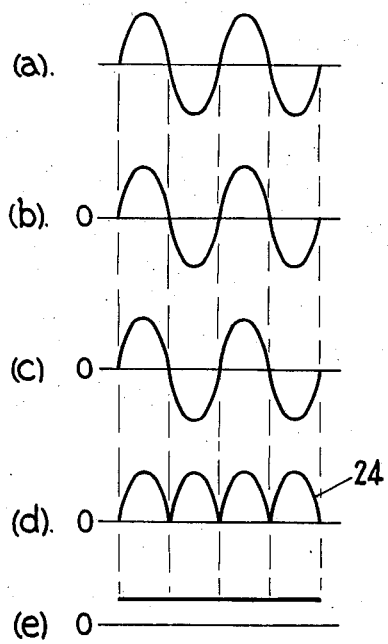

An electromagnetic wave switching system including apparatus in accordance with the invention will now be described by way of example with reference to:

FIGURE 1 which shows a longitudinal cross section through a waveguide device forming part of the switching system, FIGURE 2 shows a sectional elevation of the waveguide device at the line II—II in FIGURE 1, FIGURE 3 shows diagrammatically an electric circuit associated with the waveguide device, and FIGURES 4 and 5 show typical waveforms developed at various points in the circuit of FIGURE 3 during use of the arrangement, the waveforms $(a)$, $(b)$, . . . $(e)$ of each of these figures occuring at the points in FIGURE 3 marked (A), (B), . . . (E) respectively.

Referring now to FIGURES 1 to 2, the waveguide device comprises a length of waveguide 1 of circular cross section which contains a ferrite rod 2 and three coils 3, 4 and 10 which embrace the waveguide 1 and which are arranged so that current carried by these coils sets up a longitudinal magnetic field in the region of the rod 2. A suitable material for the rod 2 is manganese magnesium ferrite, the rod 2 being supported by a member 20 of suitable dielectric material, for example foamed polystyrene.

An input waveguide 5 of rectangular cross section is connected to the waveguide 1 by way of a transition section 6.

Two coupling loops 7 and 8 project into the waveguide 1 of the side thereof remote from the ferrite rod 2. The loops 7 and 8 are spaced 90 degrees apart round the waveguide 1 and the arrangement is such that if none of the coils 3, 4 and 10 were to be energized, there would be no rotation of the plane of polarization of electromagnetic waves supplied to the waveguide 1 while waves passed along the waveguide 1 in the region of the coupling loops 7 and 8 would be polarized in the plane which is such that the two coupling loops are symmetrically disposed one on either side of the plane.

Each of the loops 7 and 8 has an associated rectifier, for example the rectifier 9, and the unidirectional signals supplied by these two rectifiers, which signals are both of the same sense, are utilized to control the currents carried by the two like coils 3 and 4, the unidirectional signals being supplied over coaxial lines 11 and 12.

Referring now to FIGURE 3, the coils 3 and 4 are arranged to be supplied by amplifiers 13 and 14 and if, for example, the amplifiers 13 and 14 are transistor amplifiers, each of the coils 3 and 4 may be connected in the collector electrode circuit of a transistor. The coils 3 and 4 are wound so that the steady magnetic field in which the rod 2 lies is proportional to the difference between the amplitudes of the currents carried by the coils 3 and 4. The direction of this said magnetic field and thus the direction of rotation effected by the rod 2 of the plane of polarization of waves transmitted along the waveguide 1 is reversible and depends at any time on which of the coils 3 or 4 is carrying the larger current.

The coil 10 is supplied with electric oscillations by an oscillator 15 for the purpose of effecting a relatively small variation in the amplitude of the steady magnetic field produced by the coils 3 and 4. These oscillations have a sinusoidal waveform as shown in FIGURES 4(a) and 5(a) and may have a frequency in the region of 10 kilocycles per second.

The signals supplied over the coaxial lines 11 and 12 are passed through amplifiers 16 and 17 to phase sensitive detectors 18 and 19, the amplifiers 16 and 17 being controlled by switching voltages supplied over leads 21 and 22 so that only one of these two amplifiers is operative at any time. A portion of the oscillations supplied by the oscillator 15 is passed to a squaring circuit 23, which may for example, be a bi-stable circuit which is triggered by the oscillations supplied by the oscillator 15, to provide a reference signal of square waveform with which the signals supplied by the amplifiers 16 and 17 are compared by the phase sensitive detectors 18 and 19.

Consider now the situation when the voltages on the leads 21 and 22 are such that the amplifier 16 is operative and the amplifier 17 is biased by the voltage on the lead 22 so as to be cut off. If now the coils 3 and 4 are energized so that, in the region of the coupling loops 7 and 8, electromagnetic waves passed along the waveguide 1 due to the waves being supplied to the input waveguide 5 are polarized in the plane containing the loop 7, it follows that the signal supplied over the line 11 has a new component having the frequency of the oscillations supplied by the oscillator 15. Thus, as shown in FIGURE 4(b), the signal supplied over the line 11 consists of a succession of pulses 30 each corresponding to one half cycle of the oscillations shown in FIGURE 4(a). The amplifier 16 is an A.C. coupled amplifier so that the signal passed thereby (shown in FIGURE 4(c)) has substantially the same waveform as the input signal thereto but with the D.C. level changed. The output of the phase sensitive detector 18 is shown in FIGURE 4(d) and this is supplied to the amplifier 13 which has a low pass filter characteristic so that the current actually supplied to the coil 3 has zero amplitude.

If, on the other hand, the coils 3 and 4 are so energized that the electromagnetic waves in the region of the coupling loops are not polarized in the plane containing the loop 7, the various waveforms are as shown in FIGURE 5. Thus the signal supplied over line 11 has a general sinusoidal wave form with the result that the signal supplied by the phase sensitive detector 18 consists of a succession of pulses 24 as shown in FIGURE 5(d). It follows that a steady current of finite amplitude is supplied by the amplifier 13 to energize the coil 3. This in turn changes the rotation of plane of polarization effected by the rod 2 in such a sense that the plane of polarization in the region of the coupling loops is changed to bring that plane closer to the coupling loop 7. Due to the high gain round the control loop, the rotation of the plane of polarization is approximately 45° and the resulting state of affairs is very similar to that described above with reference to FIGURE 4 with the coupling loop in question approximately in the plane of polarization.

It will be appreciated that if the voltages supplied to the leads 21 and 22 are interchanged, the coupling loop 8 and the amplifier 17 are operative and the rotation of the plane of polarization by the rod 2 is through an angle of approximately 45 degrees in the opposite direction to that previously stated.

As shown in FIGURES 1 and 2, two further lengths of waveguide 25 and 26, which are both of rectangular cross section, are connected to the waveguide 1 so as to select from waves passed along the waveguide 1 those having the two planes of polarization discussed above. In order to match the waveguides 25 and 26 to the waveguide 1, irises, such as the iris 27, are provided.

It will be appreciated that with one of the two conditions of voltage on the leads 21 and 22, input waves supplied over the waveguide 5 are passed to the waveguide 25 while the other condition of voltages on the leads 21 and 22 waves supplied by the waveguide 5 are passed to the waveguide 26. The leads 21 and 22 are in fact connected to a switching circuit 28 which has an associated input terminal 29. During use, a signal having one or other of two voltages is applied to the terminal 29 and the switching circuit 28 is arranged to respond to these two voltages to apply the two voltage conditions previously discussed to the leads 21 and 22. In one example, a signal consisting of a train of regularly recurrent impulses is supplied to this terminal 29, the interval between the adjacent impulses being of equal duration to the impulses themselves, with the result that waves supplied over the input waveguide 5 are passed in alternate equal periods to the waveguides 25 and 26.

The system described above may be modified by replacing the rod 2 by an annular member which lies along the length of the waveguide 1 in contact with the waveguide wall. This construction is preferable if the system is required to handle high powers since the energy dissipated as heat in the ferrite material is more readily conducted away via the waveguide wall. Furthermore, instead of the rod 2 (or the corresponding annular member) being a single body it may be a composite structure formed, for example, by gluing end to end a plurality of short rods of suitable ferrite material.

It will be appreciated that the invention is not restricted to the use of coupling loops since in the arrangement described above by way of example, the coupling loops 7 and 8 can be replaced by coupling probes. Alternatively each of the coupling loops may be replaced by the short length of waveguide of rectangular cross section which lies across the waveguide 1 and which is coupled thereto by way of a coupling slot. One end of each of these short lengths of waveguide is terminated by a crystal rectifier for the purpose of providing a unidirectional signal, as before, while the other end is terminated by a resistive load.

Instead of controlling the amplifiers 16 and 17 so that only one is operative at a time, both these amplifiers may be operative all the time and the signals supplied by the phase sensitive detectors 18 and 19 may be added together before being supplied to an amplifier-inverter. This amplifier-inverter is arranged to supply currents to energise coils 3 and 4 so that if signals of the same amplitude were to be picked up by the coupling loops 7 and 8 (as would occur if the coils 3 and 4 were carrying currents of equal amplitude), the amplifier-inverter would operate to cause the current to one of the coils 3 and 4 to be increased and the other to be decreased so that the plane of polarisation of waves in the region of the coupling loops 7 and 8 would be rotated through approximately 45° to bring the coupling loop 7, say, substantially into that plane. In this case a switching signal is supplied to the amplifier-inverter effectively to change over the connections of the coils 3 and 4 for the purpose of introducing a rotation of approximately 45 degrees in the other direction. It will be appreciated that in each of the two working conditions only one of the two coupling loops 7 and 8 is effectively in use, that one and its associated phase sensitive detector operating in the manner described above with reference to FIGURE 5 while the other loop and its other associated phase sensitive detector operates in the manner described above with reference to FIGURE 4.

Both the output waveguides 25 and 26 may be terminated by a utilization device but if, alternatively, the waveguide 25 is terminated by a matched resistive load, the switching system operates selectively to connect the input waveguide 5 and the output waveguide 26.

I claim:

1. An electromagnetic wave switching system comprising a length of waveguide which contains ferromagnetic ceramic material and which is arranged to effect rotation of the plane of polarization of plane-polarized electromagnetic waves transmitted therethrough in dependence upon the magnetic field in which the ferromagnetic ceramic material lies, an input waveguide connected to one end of said length of waveguide, first and second output waveguides connected to the other end of said length of waveguide to pass to the first output waveguide electromagnetic waves supplied by said length of waveguide with a first predetermined plane of polarization and to pass to the second output waveguide electromagnetic waves supplied by said length of waveguide with a second predetermined plane of polarization which is different from the first plane of polarization, means to provide a steady magnetic field in which said ceramic ferromagnetic material lies, means to provide an oscillatory magnetic field in which said ferromagnetic material lies, two detector means, two polarization-sensitive couplings which are spaced around said length of waveguide and each of which passes a portion of waves transmitted by said length of waveguide after rotation therein to a different one of said detector means and each of said detector means supplies an electric signal the amplitude of which varies as a result of said oscillatory magnetic field, means to control said means to provide a steady magnetic field, and switching means selectively having first and second conditions to control the last mentioned means and in said first and second conditions the steady magnetic field in which the ceramic ferromagnetic material lies is controlled in dependence upon the signals supplied by the two detector means respectively so that electromagnetic waves supplied over the input waveguide are passed mainly to the first and second output waveguides respectively.

2. A switching system according to claim 1 wherein said two planes are at right angles.

3. A switching system according to claim 1 wherein each of the polarization-sensitive couplings comprises a coupling loop projecting into the length of waveguide.

References Cited in the file of this patent

UNITED STATES PATENTS

| | | |
|---|---|---|
| 2,472,165 | Mankin | June 7, 1949 |
| 2,748,353 | Hogan | May 29, 1956 |
| 2,824,288 | Sensiper | Feb. 18, 1958 |
| 2,857,575 | Zaleski | Oct. 21, 1958 |
| 2,885,677 | Zaleski | May 5, 1959 |
| 3,081,438 | Levy | Mar. 12, 1963 |